(12) United States Patent
Khan et al.

(10) Patent No.: US 11,310,889 B2
(45) Date of Patent: Apr. 19, 2022

(54) MOTION DETECTOR, A LUMINAIRE, A CORRESPONDING METHOD

(71) Applicant: SIGNIFY HOLDING B.V., Eindhoven (NL)

(72) Inventors: Shoaib Hussain Khan, Eindhoven (NL); Matthew Steven Whitehill, Eindhoven (NL); Fetze Pijlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/295,069

(22) PCT Filed: Dec. 5, 2019

(86) PCT No.: PCT/EP2019/083787
§ 371 (c)(1),
(2) Date: May 19, 2021

(87) PCT Pub. No.: WO2020/120273
PCT Pub. Date: Jun. 18, 2020

(65) Prior Publication Data
US 2022/0022303 A1 Jan. 20, 2022

Related U.S. Application Data

(60) Provisional application No. 62/778,330, filed on Dec. 12, 2018.

(30) Foreign Application Priority Data

Dec. 27, 2018 (EP) .................................. 18248034

(51) Int. Cl.
H05B 47/12 (2020.01)
G01S 13/56 (2006.01)
H05B 47/16 (2020.01)

(52) U.S. Cl.
CPC .............. H05B 47/12 (2020.01); G01S 13/56 (2013.01); H05B 47/16 (2020.01)

(58) Field of Classification Search
CPC ........ H05B 47/10; H05B 47/12; H05B 47/16; G01S 13/56
See application file for complete search history.

(56) References Cited

U.S. PATENT DOCUMENTS 5,323,337 A 6/1994 Wilson et al.
10,362,221 B1 * 7/2019 Linzer ....................... G06T 5/20
(Continued)

FOREIGN PATENT DOCUMENTS

EP 3591423 A1 1/2020
JP 2011047779 A 3/2011
(Continued)

OTHER PUBLICATIONS

Masatoshi Sekine, et al., "Activity Recognition Using Radio Doppler Effect for Human Monitoring Service," Journal of Information Processing, vol. 20, No. 2, Apr. 2012 (10 Pages).

*Primary Examiner* — Jimmy T Vu

(57) ABSTRACT

Some embodiments are directed to a motion detector configured to classify an environment as quiet or motion. The motion detector is configured to estimate if the frequency bins in a motion signal correspond to a motion source in the environment or to a noise source in the environment. Some embodiments are directed to a luminaire comprising a motion detector.

13 Claims, 7 Drawing Sheets

(56) References Cited

U.S. PATENT DOCUMENTS

| | | |
|---|---|---|
| 2012/0016221 A1 | 1/2012 | Saadat et al. |
| 2013/0041856 A1 | 2/2013 | Benitez et al. |
| 2017/0016221 A1 | 1/2017 | Yamamoto et al. |
| 2018/0047415 A1 | 2/2018 | Nongpiur et al. |

FOREIGN PATENT DOCUMENTS

| | | |
|---|---|---|
| JP | 2014013229 A | 1/2014 |
| JP | 2014130085 A | 7/2014 |
| KR | 20120056781 A | 6/2012 |
| KR | 20160141503 A | 12/2016 |
| WO | 2017117316 A1 | 7/2017 |

\* cited by examiner

MOTION DETECTOR, A LUMINAIRE, A CORRESPONDING METHOD

CROSS-REFERENCE TO PRIOR APPLICATIONS

This application is the U.S. National Phase application under 35 U.S.C. § 371 of International Application No. PCT/EP2019/083787, filed on Dec. 5, 2019, which claims the benefit of U.S. Provisional Patent Application No. 62/778,330, filed on Dec. 12, 2018 and European Patent Application No. 18248034.3, filed on Dec. 27, 2018. These applications are hereby incorporated by reference herein.

FIELD OF THE INVENTION

The invention relates to a motion detector, a luminaire, a motion detection method, a computer readable medium.

BACKGROUND OF THE INVENTION

Reliable motion detection is important in a number of fields. For example, motion detection is used in lighting systems to control the lighting. Using a motion detector it can be avoided that lights are turned on when no persons are present. Other applications are, e.g., in burglar alarms, and office occupancy detection, e.g., for office management.

Unfortunately, motion sensing suffers from a number of problems. One problem for motion sensors is that they can be sensitive to a particular type of narrow-frequency noise, which is sometimes referred to a hum, or hum-type noise. In particular, sensors based on the Doppler effect are vulnerable to false positives caused by hum noise.

A known motion sensor is described in Korean patent application KR20160141503, "APPARATUS AND METHOD FOR DRIVING LIGHT", which is included herein by reference. In the Korean patent application, a lighting driving device is disclosed for driving a lighting device equipped with a motion sensing part. The device automatically controls lighting depending on whether motion is detected or not.

The motion detection unit is a microwave (RF) Doppler sensor and uses the Doppler effect to detect a motion by detecting a wave generated by a wave source. The motion sensing unit detects not only the movement of the object but also vibrations occurring in the surroundings. There is thus the problem that the lamp may be turned on when only vibrations occur but no movement.

FIG. 1 of the cited patent illustrates the known lighting driving device. The known device includes a vibration sensing unit for sensing a vibration in addition to the motion sensing unit.

The motion sensing unit is a RF Doppler sensor that senses motion using a Doppler effect using microwave (RF) and outputs a motion sensing signal of a corresponding size. The vibration sensing unit is a micro-electro-mechanical system (MEMS) which measures an acceleration and senses vibration, and outputs an electrical signal of a corresponding magnitude as a vibration sensing signal.

A controller lights an illumination device when motion is detected by the motion detection unit, but only at a time when no vibration is detected. This prevents the illumination device from being turned on when a vibration is detected.

US2012/016221A1 discloses a toilet seat apparatus capable of detecting various motions of a human body such as entering and leaving a restroom, sitting on and rising from a toilet seat. A human body detector includes a frequency analyzer, a recognizer, and a database device storing sample data. The frequency analyzer converts a sensor signal into a frequency domain signal, and extracts signals of individual filter banks with different frequency bands. The recognizer has functions of detecting a human body entering a space where at least a toilet bowl is installed and a human body of a person sitting on a toilet seat based on comparison between the sample data and detection data containing a frequency distribution of signals based on the signals of the individual filter banks.

KR20120056781A discloses an air conditioner that comprises a microphone, an amplifier, and a wide band extracting unit. The microphone receives the sound of air conditioning space. The amplifier amplifies the received sound signal of the microphone. The wide band extracting unit is extracts specific frequency band from the amplified sound signal. A plurality of band extracting units extracts respectively different frequency bands.

WO2017/117316A1 discloses a lighting system that includes a mounting assembly configured to mount the lighting system in a portion of a room, wherein the lighting system is configured to illuminate the portion of the room, a user interface configured to accept lighting settings for the lighting system, and at least one light source having at least one configurable setting based on the lighting settings from the user interface.

KR20160141503A discloses an apparatus for driving lighting that comprises a vibration detection unit to detect vibration to output a vibration detection signal of a corresponding vibration state, a motion detection unit to use a Doppler effect to output a motion detection signal of a state corresponding to a detected motion, an operation control unit connected to the vibration detection unit and the motion detection unit, and a lighting device drive unit connected to the operation control unit. The operation control unit uses the state of the vibration detection signal of the vibration detection unit to output a control signal for turning on a lighting device to the lighting device drive unit if the state of the motion detection signal of the motion detection unit is a state where a motion is detected while vibration is not detected.

SUMMARY OF THE INVENTION

The known system has a number of drawbacks. Firstly, the known system requires a separate vibration sensor in addition to the motion sensor. This increases the list of parts, increases system complexity and costs. Secondly, so long as a vibration is detected no motion can be detected. Hum can be intermitted, and may last only a few seconds, but the inventors have observed that hum-type noise can also last for hours. Such a persistent hum would turn the known system inoperable, since while the hum lasts, no motion is detected and thus no lights are turned on. Alternatively, the threshold for vibrations must be set at a high level, so that the risk of false positives caused by one or more hum noise sources remains. Thirdly, the known system detects only mechanical vibrations. However, the inventors observed that hum noise can also originate from an electrical source.

To address these and other problems, a motion detector is proposed. The motion detector may be configured to classify an environment as quiet or motion. The detector may comprise a signal input for receiving a sensor signal of a motion sensor, and a processor. The processor may be configured for one or more of:

converting the sensor signal to a frequency domain, obtaining a plurality of frequency bins, identifying frequency bins having an increased magnitude, estimating whether the identified frequency bins correspond to a motion source in the environment or to a noise source in the environment, by estimating an identified frequency bin with increased magnitude as caused by noise by determining that near frequency bins have no increased magnitude, wherein a frequency bin is near if a frequency difference between the near frequency bin and the identified frequency bin is below an upper frequency threshold and above a lower frequency threshold, determining from the identified frequency bins estimated as corresponding to a motion source whether the environment is classified as quiet or motion, by estimating an identified frequency bin with increased magnitude as caused by motion by determining that near frequency bins have increased magnitude and are not estimated as caused by noise.

The motion detection has the advantage that no separate vibration sensor is needed. Instead, hum noise can be detected directly from the motion sensor's output. Furthermore, even if some frequency bins are identified as noise-caused, motion can still be detected from other frequencies. For example, in an embodiment, the determining may comprise determining an energy in the frequency bins estimated as corresponding to a motion source. The environment may then be classified as motion, e.g., if the determined energy exceeds a threshold. Frequency bins may be implemented as the frequencies produced by a frequency domain conversion, e.g., FFT or DFT. A frequency bin is termed bin since it actually corresponds to a narrow range of frequencies, which for a Doppler sensor in turn corresponds to a narrow range of velocities in the area surrounding the sensor.

In an embodiment, a particular bin may be estimated as caused by noise by determining that no near frequency bin has an increased magnitude. A near frequency bin has a near frequency, e.g., has a frequency difference with the particular bin that is below a threshold; for example, the threshold may be 10 Hz for a 5.8 GHz sensor modality, etc. However, very close bins, called adjacent bins, that have a frequency difference with the particular bin that is even smaller, e.g., below 4 Hz, are excluded from this estimation. The motion detector is an electronic device.

An aspect of the invention concerns a luminaire comprising the motion detector. An aspect of the invention concerns a motion detection method.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises a transitory or non-transitory computer readable medium representing instructions which, when executed by a processor system, cause the processor system to perform steps of the method according to the invention.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a motion detector, FIG. 1b schematically shows an example of an embodiment of a luminaire, FIG. 1c schematically shows an example of an embodiment of a lighting system, FIG. 2 schematically shows an example of an embodiment of a frequency versus time diagram, FIG. 3a schematically shows an example of an embodiment of frequency bins, FIG. 3b schematically shows an example of an embodiment of frequency bin classifications, FIG. 3c schematically shows an example of an embodiment of frequency bins, FIG. 3d schematically shows an example of an embodiment of a noise detection method, FIG. 4 schematically shows an example of an embodiment of a frequency versus time diagram, FIG. 5 schematically shows an example of an embodiment of a raw signal diagram, FIG. 6 schematically shows an example of an embodiment of a motion detect method, FIG. 7a schematically shows a computer readable medium having a writable part comprising a computer program according to an embodiment, FIG. 7b schematically shows a representation of a processor system according to an embodiment.

Figure 1A:
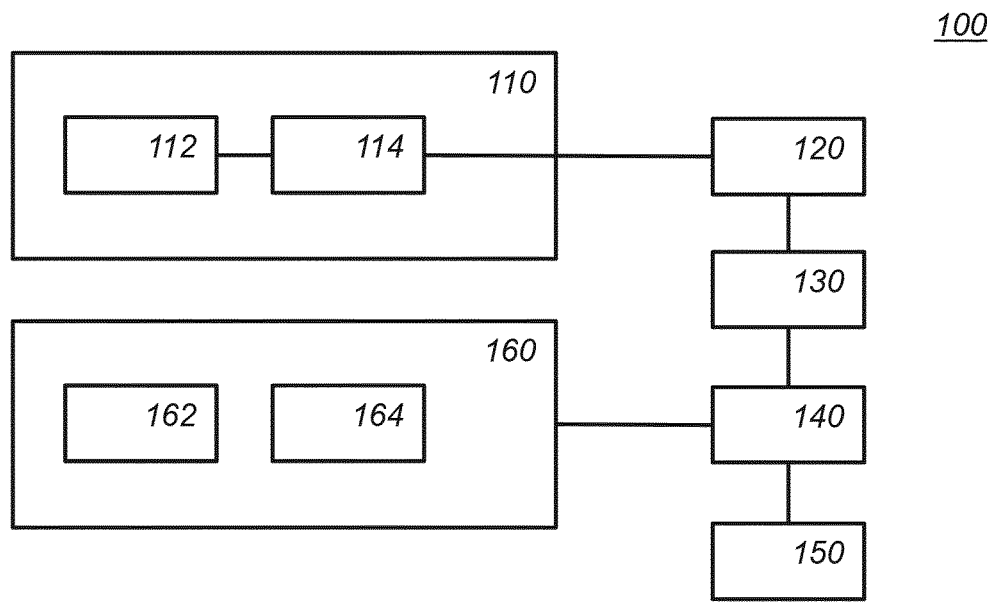

LIST OF REFERENCE NUMERALS IN FIGS.
1a-1c, 2, 3a-3b, 4, 7a-7b 100 a motion detector
110 a motion sensor
112 a sensor
114 a signal processing unit
120 a signal input
130 a frequency domain converter
140 a noise detect unit
150 a motion detector
160 a history unit
162 a short term history
164 a long term history
170 a luminaire
171 a lighting system
172 a lighting element
173 a computer network
175 a lighting controller
200 a schematic frequency versus time diagram
201 a frequency axis
202 a time axis
203 a time
204 a frequency
210 an identified frequency bin
212 an adjacent bin
222, 224 adjacent frequency bins
232, 234 near frequency bins
300 multiple frequency bin units
310 an identified frequency bin
322, 324 an adjacent frequency bin
332, 334 a near frequency bin
340 a far frequency bin
341 a frequency bin classification

410, 411 a frequency corresponding to hum-type noise.
1000 a computer readable medium
1010 a writable part
1020 a computer program
1100 a device
1110 a system bus
1120 a processor
1130 a memory
1140 a user interface
1150 a communication interface
1160 a storage
1161 an operating system
1162, 1163, 1164 instructions

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a motion detector 100.

Figure 1B:
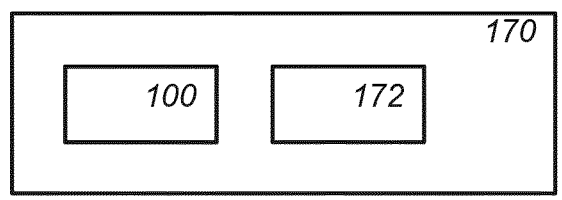
Figure 1C:
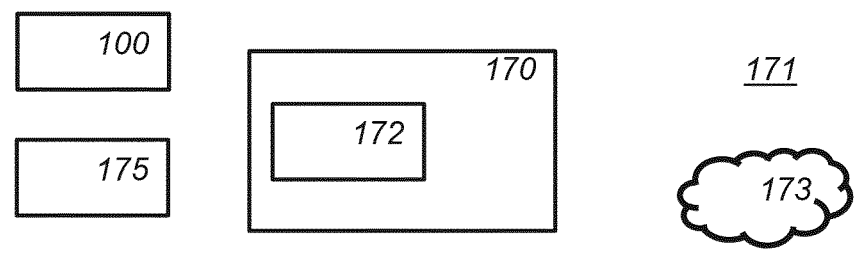

The motion detector can be used for a variety of applications, particularly advantageous of which is illumination. For example, FIG. 1b schematically shows an example of an embodiment of a luminaire 170. Luminaire 170 may comprise motion detector 100 and a lighting element 172. For example, the lighting element may be configured to radiate light when motion detector 100 detects motion. The lighting element may be one or more LEDs. For example, FIG. 1c schematically shows an example of an embodiment of a lighting system 171. Lighting system 171 comprises a luminaire 170, typically multiple luminaires, a motion detector 100, typically multiple motion detectors, and a lighting controller 175. Lighting controller 175 is configured to receive motion signals, e.g., quiet/motion classifications from the motion detectors and determine, based thereupon, a lighting control signal. The lighting control signal is sent to the one or more luminaires, who then illuminates in accordance with the control signal. One or more of the motion detectors may be incorporated in the luminaires, but that is not needed. The communication between motion detector, lighting controller and luminaire may proceed over a digital communication network, e.g., a computer network.

For example, the various devices of system 171 may communicate with each other over a computer network 173. The computer network may be an internet, an intranet, a LAN, a WLAN, etc. Computer network 173 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 171 as needed.

For example, the connection interface may comprise a connector, e.g., a wired connector, e.g., an Ethernet connector, an optical connector, etc., or a wireless connector, e.g., an antenna, e.g., a Wi-Fi, 4G or 5G antenna. For example, the devices 100, 175 and 170 may each comprise a communication interface. Computer network 173 may comprise additional elements, e.g., a router, a hub, etc.

The execution of motion detector 100 may be implemented in a processor circuit, examples of which are shown herein. FIG. 1a for example shows functional units that may be functional units of motion detector and, e.g., of the processor circuit. For example, FIG. 1a may be used as a blueprint of a possible functional organization of the processor circuit. The processor circuit is not shown separate from the units in FIG. 1a. For example, the functional units shown in FIG. 1a may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., signal coprocessors, and partially in software stored and executed on device 100.

There are other applications for a motion detector than lighting control. For example, a motion detector may be used in a burglar alarm. For example, motion sensors may be used to detect occupancy in offices, which in turn may be used to manage the office, e.g., to suggest an empty office for use, or report on office occupancy over time.

Motion detector 100, as shown in FIG. 1a, comprises a motion sensor 110; this is not necessary though. The motion detector 100 may use an external motion sensor. Part of the signal processing may be done in the external motion sensor or in the motion detector itself. In an embodiment, the motion sensor 110 may be an integral part of motion detector 100. Motion sensor 110 is configured to generate a sensor signal for the motion detector.

There are various choices for the motion sensor. For example, motion sensor 110 may be a Doppler motion sensor, micro-wave sensor, or ambient light sensor, etc. As a motivating example, embodiments below will be described for a Doppler sensor. It is noted however, that the motion detector may be combined with any motion sensor for which noise is problem, especially noise of hum-type.

In an embodiment, the motion sensor 110 may comprise a sensor 112 and a processing unit 114. The processing unit 114 may perform pre-processing before the signal is further processed by the rest of motion detector 100. Processing unit 114 is optional.

For example, in an embodiment, motion sensor 110 may be of Doppler type. For example, a Doppler sensor may be configured to detect motion or speed of moving objects through the Doppler principle. Sensor 112 may be configured to transmit a signal, for example, a microwave signal. For example, the transmitted signal may have a frequency of from 5 to 20 Ghz, lower or higher is also possible. Sensor 112 may be configured to receive the signal back. A shift in the frequency signal is related to the speed with respect to the sensor of moving objects that reflected the transmitted signal. For example, one way of processing in a Doppler sensor is to compute a product of the transmitted signal and the received signal, and to apply a low-pass filter to the multiplied signals. It can be shown with geometric functions that the resulting signal comprises the frequency shifts. For example, processing unit 114 may be configured to multiply the transmitted and received signal and apply a low-pass filter.

The resulting signal is provided to a signal input 120 of motion detector 100. For example, signal input 120 may be an internal input. Signal input 120 may also be an input-port, e.g., an electronic input port, or a digital input port, e.g., an API, or the like. For example, in an embodiment the sensor signal of motion sensor 110 received at signal input 120, may be a signal in which frequency components correspond to Doppler shifts and thus to velocities of objects in the area surrounding sensor 110. In an embodiment, the signal is a received signal reflected off objects in the surrounding area. In the latter case further Doppler processing may be performed after receiving the signal at the signal input.

Motion detector 100 comprises a frequency domain converter 130, a noise detect unit 140 and a motion detector 150. Frequency domain converter 130 converts the received signal from a time domain to a frequency domain. For example, converter 130 may perform a Fourier transformation. For example, converter 130 may perform a Discrete Fourier transform (DFT). If needed converter 130 may first perform an analog to digital conversion, e.g., an ADD conversion, e.g., before performing the conversion to the frequency domain.

In an embodiment, the received signal is portioned into portions, e.g., portions with a pre-determined number of time-domain samples. On each of the portions the frequency conversion may be performed. As a result, so-called frequency bins are obtained. A frequency bin is the magnitude of a range of frequencies that is present in the received signal. For example, one frequency bin may represent the frequency range from 40-42 Hz. The frequency range corresponding to a frequency bin may be, e.g., about 2 Hz, or more, or less, say in the range from 0.5 to 5 Hz. The magnitude may be taken as the absolute value of the amplitude.

For example, a frequency conversion may be performed each time after a pre-determined number of time-domain samples have been obtained. For example, every 24 time-domain samples a frequency domain conversion may be performed. As a result the frequency bins show an evolution over time; an increase in a frequency bin, e.g., an increase in the magnitude for a particular frequency range may correspond to an increase in a particular velocity in the area surrounding the sensor. The increase in a frequency bin may indicate motion in the area. A high-pass or low-pass filter, or both may be applied to the signal, or to the bins, to eliminate frequencies that are too high or too low to be usable.

For example, in an embodiment, a motion detect algorithm determines whether the current state of the environmental conditions is quiet or motion. To determine this state, samples from, say, a Doppler motion sensor, are pre-processed, then converted to the frequency domain, e.g., using a Fourier transform, e.g., FFT, DFT, etc. For each bin with higher magnitude, e.g., compared to a threshold for that bin, that bin may be said to having seen motion. For example, for each run of the motion algorithm, each frequency bin that calls motion may be checked for the hum condition. However, other frequency bins that call motion which are not identified as a hum may still contribute to calling motion. Thus, true motions will still trigger a motion call even if a hum condition exists in some bins. In an embodiment, the motion detector may, for each time slice, check all frequency bins for increased magnitude, which may indicate motion.

After the conversion from the time-domain to the frequency-domain motion is detected by a noise detect unit 140 from the frequency bins, e.g., from the magnitudes of the frequency ranges.

For example, noise detect unit 140 may be configured to identify frequency bins having an increased magnitude. For example, a magnitude may be detected that is higher than some threshold value. The threshold value may be predetermined. For example, a magnitude may be detected that is increasing over time. A high value in a frequency bin may correspond to large or many objects with the corresponding velocity. However, a frequency bin with an increased magnitude may also be caused by noise. There may be one or a few thresholds for all bins, or there may be a threshold for each bin, etc.

For example, noise detect unit 140 may be configured to estimate if the identified frequency bins correspond to a motion source in the environment or to a noise source in the environment.

A problem with motion sensors, in particular also with Doppler type motion sensors is a type of noise, referred to as hum noise. Hum noise sources cause elevated signals in a certain frequency bin, often intermittently. Hum noise may be caused by vibrations, e.g., caused by e.g., a driver inside a luminaire or an external device. Hum noise may also be caused by mechanical structures in the environment such as a lamella optic present in T-LED fixtures. Hum noise tends to be localized to one or two adjacent frequency bins, e.g., having a bandwidth of around few Hertz, but hum noise may sometimes span more than 2 bins as well.

The intermittent nature of the signal can cause false positive motion calls. For example, a hum noise-source, e.g., an electronic driver or a lamella optic may cause an increase in a particular frequency bin, which in turn may be interpreted as motion in the area surrounding the sensor, but which in reality is only due to the hum noise.

Motion detector 150 is configured to classify the environment as quiet or motion. For example, motion detector 150 may base its determination on those frequency bins that are not estimated to belong to a noise source, in particular not to a hum noise source. For example, motion detector 150 may base its determination on those frequency bins that are estimated to belong to a motion source. For example, some frequency bins may be identified as corresponding to a motion source, this may be those bins that have an increased magnitude and are not estimated to be noise, or this may involve some further recognition step.

There are various ways in which motion detector 150 can make the classification. For example, depending on the application, the motion detector may be configured to detect small motions or not. For example, a motion detector used in an office for lighting control may be configured with a low threshold for motion, e.g., to detect motions such as typing. For example, a motion detector used in a hallway for lighting control may be configured with a larger threshold for motion, e.g., to detect larger motions such as walking. This avoids, in the first case, that lights turn off when occupants are relative motionless expect for small motions such as typing, or, in the second case, that lights in a hallway turn on to easily due to false-positives.

For example, motion detector 150 may be configured to determine an energy in the frequency bins estimated as corresponding to a motion source, the environment being classified as motion if the determined energy exceeds a threshold. For example, energy may be computed by squaring and adding the frequency bins. For example, the energy may be a weighted energy. For example, frequencies that correspond to walking may be given a higher weight than those that do not. If the energy or weighted energy in the bins that correspond to motion, e.g., that do not correspond to noise, exceed a threshold then the area is classified a motion.

If not, then the area may be classified as quiet. By tuning the threshold and/or the weighing, the sensitivity of the motion detector may be tuned as desired for the application. This can be done empirically.

Figure 2:
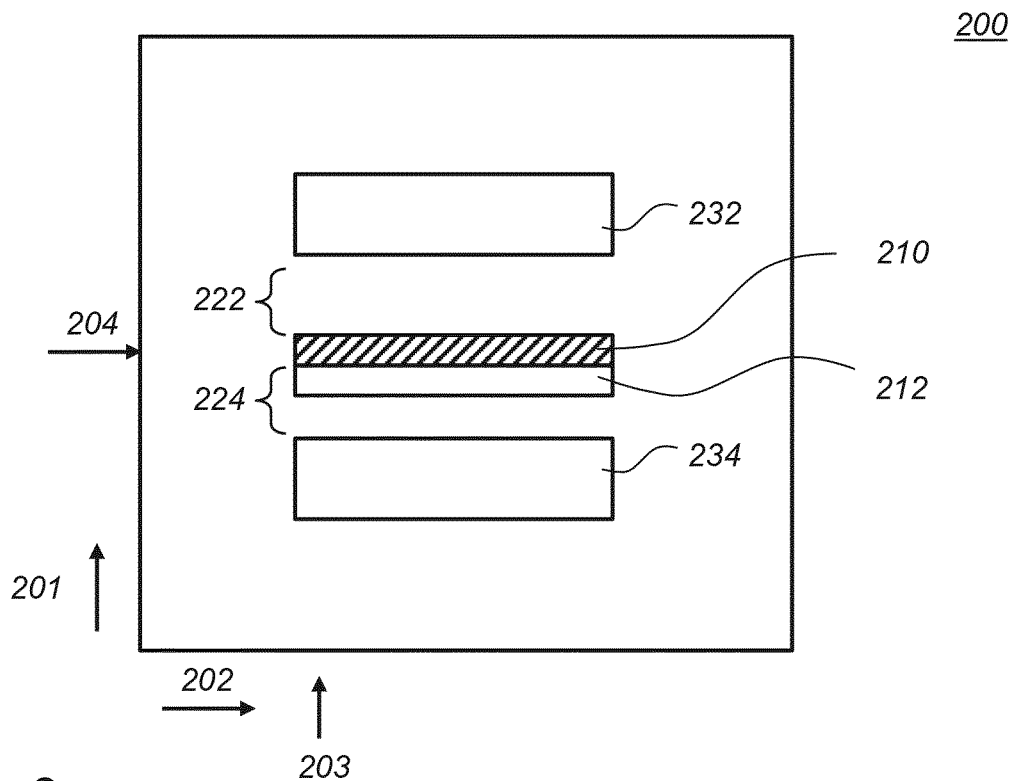
Figure 4:
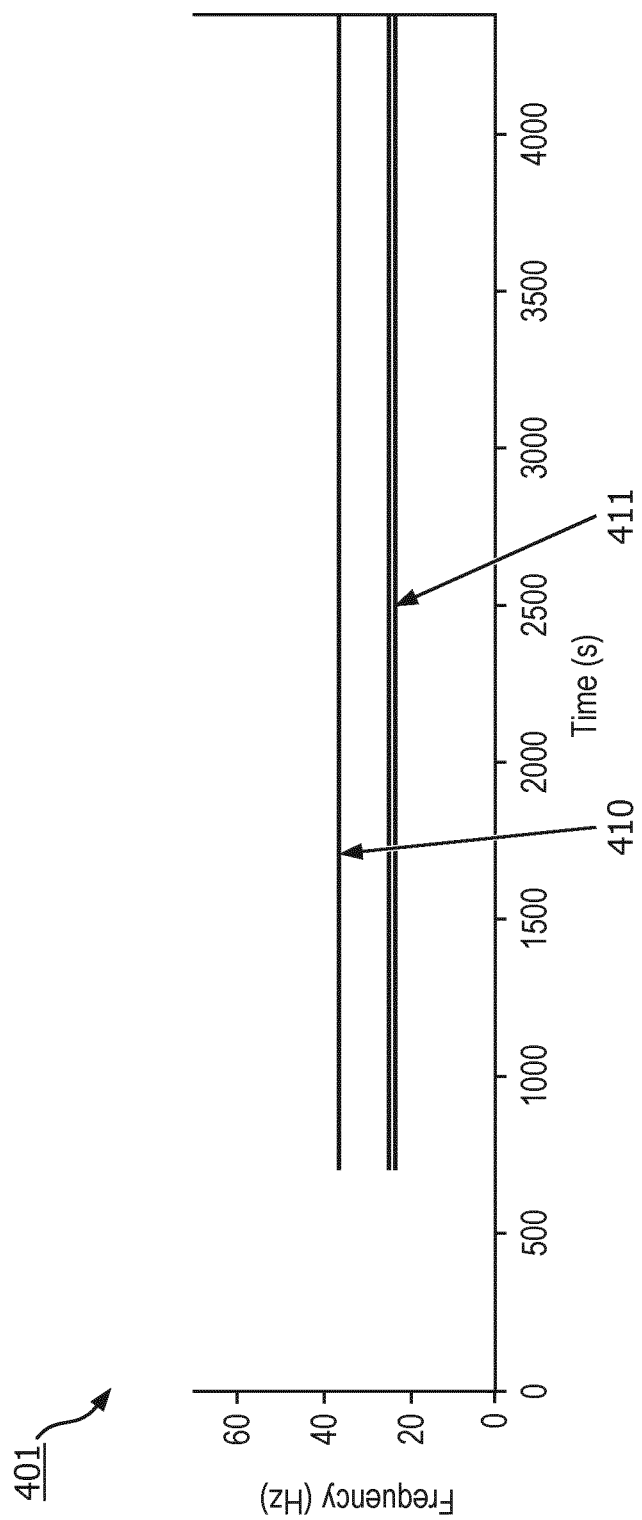
Figure 5:
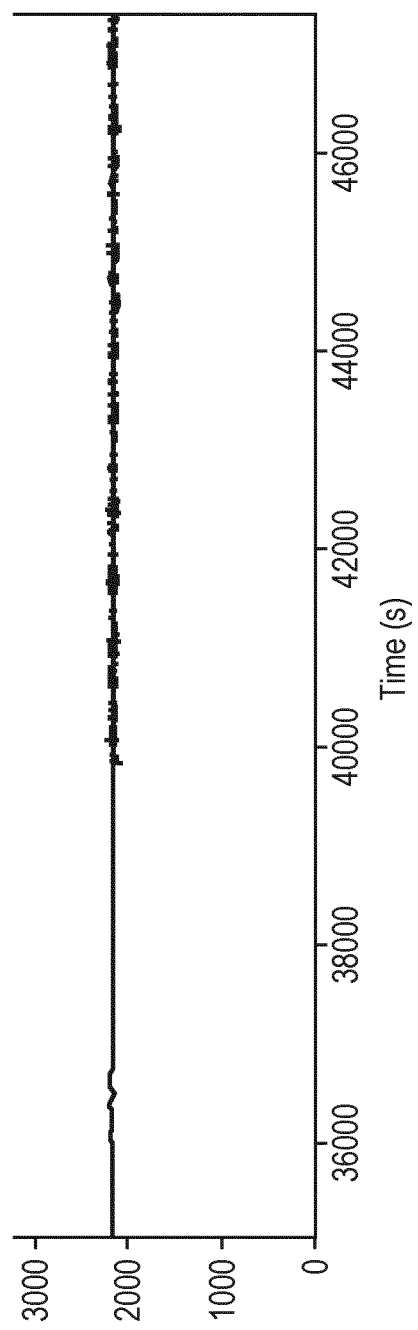

There are various ways in which bins can be estimated to correspond to noise. This may be illustrated using frequency versus time diagram. FIG. 4 schematically show an example of an embodiment of a frequency versus time diagram. Initially, a signal such as is shown in FIG. 5 is received, e.g., as signal input 120. In FIG. 5, Doppler processing already done, e.g., multiplying of the received and transmitted waveforms followed by a low-pass filter. FIG. 5 shows on the horizontal axis, time, in the form of number of time-domain samples received. On the vertical axis the sample value is shown. To obtain the diagram of FIG. 4, the time samples are portioned, e.g., into 24 sample intervals, this is also referred to as a time slice. Each interval may be said to correspond to a time point. For each time point, e.g., for each 24 time-domain samples, a frequency conversion may be done, yielding a number of frequency bins. For example, a DFT transformation may be done. In the vertical bar directly above a point in time, FIG. 4 shows the magnitude of a particular frequency bin as an intensity of grey. A lighter colored pixel in these figures corresponds to a higher magnitude at the time point indicated on the horizontal axis and the frequency bin, indicated on the vertical axis. FIG. 2 schematically shows an example of an embodiment of the frequency versus time diagram, e.g., of the type shown in FIG. 4, to illustrate an embodiment of a noise detect unit 140.

Schematic diagram FIG. 2 shows a frequency axis 201 and a time axis 202. At a particular point in time, e.g., time point 203, a frequency bin 210 with an increased magnitude is detected. For example, at time point 203, noise detect unit 140 may determine that at frequency 204 the magnitude is increased, e.g., has grown compared to before point 203, or is larger than some pre-determined threshold. Frequency bin 210 remains increased for some time, as can be seen from FIG. 2, because the box 210 extends in the horizontal direction.

An elevated magnitude in frequency bin 210 may indicate motion, especially if the increase remains for some time, but it may also be caused by hum-type noise. After identifying frequency bin 210 as increased, noise detection unit 140 may estimate the identified frequency bin as caused by noise from near frequencies. A near frequency bin is close, but not too close to the identified bin. For example, a frequency bin is near if a frequency difference between the near frequency bin and the identified frequency bin is below an upper frequency threshold and above a lower frequency threshold. The threshold is determined, inter alia, upon the frequency of the Doppler sensor; a 5.8 Ghz sensor will have different threshold than a 10 Ghz sensor. As an example, for a 5.8 Ghz sensor a bin may be taken as about 1-2 Hz wide. The lower frequency threshold may be taken as about 2-4 Hz, and the upper frequency threshold as about 5-10 Hz. For example, a lower threshold of 4 Hz, and an upper threshold of 10 Hz may be used.

In FIG. 2 the near frequency bins are indicated as 232 with a higher frequency and 234 with a lower frequency. Note that FIG. 2 shows that between the near frequencies and the identified frequency 210 there are adjacent frequencies; higher adjacent frequencies 222 and lower adjacent frequencies 224. One bin, bin 212 which is directly adjacent to identified bin 210 is separately drawn and will be further discussed below.

Interestingly, identified frequency 210 is estimated to be noise-caused if the near frequencies 232 and 234 show no increased magnitude. This works because real motions typically cause increased magnitude in a large number of frequency bins, e.g., representing an increased velocity. For example, a real motion with a velocity centered around bin 210 may show an increased magnitude in all or most of bins 232, 222, 210, 224, and 234. A hum-caused increase in magnitude will cause an increase only in bin 210, and possibly a few bins that are very close to it. By detecting that an increased magnitude in bin 210 is not accompanied by an increased magnitude in near bins a noise-caused bin can be detected. By ignoring the adjacent bins 222 and 224 for this analysis, it is avoided that a noise-caused bin would not be categorized as such, if its magnitude were to leak into an adjacent bin. The correct bandwidth for adjacent bins 222 and 224 may be determined by measuring how wide a hum noise typically is for a particular sensor.

Once a frequency bin is estimated to be a noise-caused bin, other bins may also be so classified. For example, suppose bin 210 is identified as a noise-cause bin; For example, this may happen because neither near-bins 232 nor near-bins 234 show an increased magnitude. Also, suppose that bin 212, which is an adjacent but not a near bin, also shows an increased magnitude. In this situation, bin 212 can be classified as a noise-bin as well. Probably, part of the energy of hum shows up in two adjacent bins: bins 210 and 212. These additional classifications may be done for any adjacent bins, e.g., any bin in the range 222 and 224, e.g., any bin with a frequency difference with bin 210 that is less than the lower threshold.

However, stricter criteria may be established, for example, to classify bin 212 a further lower threshold may be used, e.g., lower than the lower threshold. This would mean that the adjacent bins are ignored when estimating a bin as noise, but not all of them are automatically estimated as noise themselves, only those bins that are even closer to bin 210. One may also require that only adjacent bins are classified as noise-caused based upon bin 210's classification as such, if they are either immediately adjacent bins, or that any bin in between bin 210 and the adjacent bin have an increased magnitude. This works because hum energy that leaks into one or more adjacent bin, typically does not skip any bins.

In addition to estimating a bin as noise-caused, a bin may also be classified as motion-caused. For example, once bins are identified as noise-caused, then any bin which is not noise-caused, and which has an increased magnitude, may be estimated as motion caused. However, this can be improved using the following criterion. For example, a bin may be estimated as motion caused if it has an increased magnitude and has a near bin which also shows an increased magnitude which is not estimated as noise-caused.

For example, suppose bin 210 is being considered as motion-caused or not. If bin 210 has increased magnitude and at least one bin of bins 232 or 234 has increased magnitude and was not estimated as noise-caused, then bin 210 is classified as motion-caused.

Figure 3A:
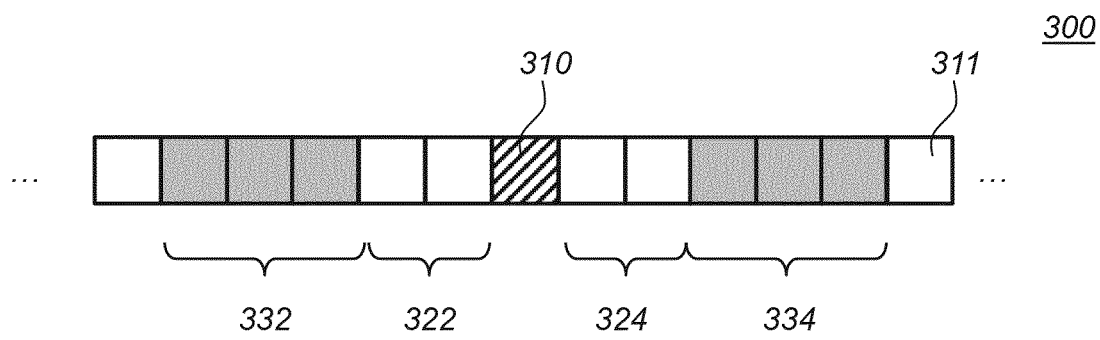
Figure 3B:
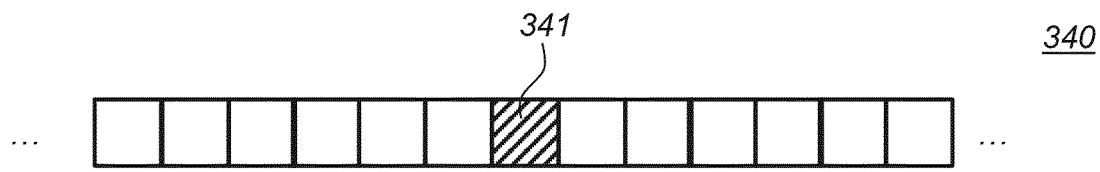

FIG. 3a schematically shows an example of an embodiment of frequency bins. FIG. 3a shows a number of frequency bins as small squares. Each frequency bin may be implemented in a memory of motion detector 100. In FIG. 3a the frequency bins are shown as adjacent squares if the corresponding frequency bandwidth is also adjacent. A frequency bin stores the magnitude obtained for that frequency bin. A frequency bin may also store one or more past magnitudes obtained for that frequency bin. FIG. 3b schematically shows an example of an embodiment of frequency bin classifications. For example, a classification may be noise-caused or motion-caused. A classification may also be unknown, or not-increased.

For example, motion detector 100, e.g., noise detect unit 140 may consider each of the frequency bins. For example, when considering bin 310, a number of adjacent bins, in this case two adjacent bins, in this case bins 322 and 324 may be ignored. If bin 310 has an increased magnitude and none of near bins 332 and 334 have an increased magnitude then bin 310 may be classified as noise-caused. This may be registered in classification 341 that corresponds to bin 310.

Figure 3C:
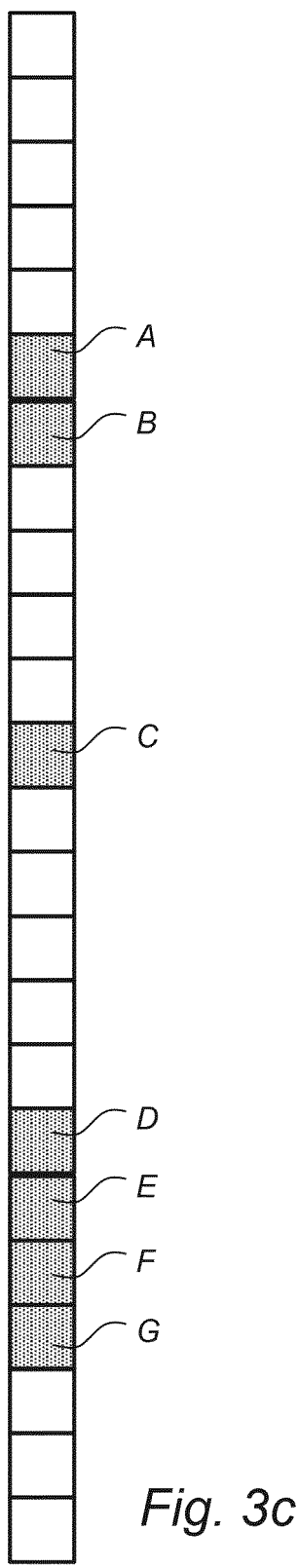

A further example is given with respect to FIG. 3c. Shown are a number of frequency bins, e.g., as for FIG. 3a, though aligned vertically. Those frequency bins with an increased magnitude are filled with a speckle pattern and provided with a reference letter. Given this, pattern motion detector 100, e.g., noise detector 140 may perform the following analysis. We use the same threshold as shown in FIG. 3a, e.g., two adjacent bins, and three near bins, on both sides. Bin A may be marked as noise-caused, since it has no near bins that are elevated. Bin B may then also be marked as noise-caused since it is adjacent to bin A, even though for bin B there is near active bin C. Bin C may then not-be classified as motion. Although it has a near bin that is elevated: bin B, the latter is estimated as noise caused. Accordingly, bin C may be classified as unknown. One may classify bin C as noise instead, with the understanding that this will affect the trade-off between false positives and false negatives. Bin D may be classified as motion because it has a near increased bin: bin G. Likewise bin G may be classified as motion. Bins E and F may be classified as noise-caused following this rule since they have no near active bin. In an embodiment, they may be classified as motion, because they are adjacent and between motion classified bins. For example, bins E and F could be classified as motion based on being part of a sequence of increased magnitude bins, at least one of which is classified as motion. Again such a rule will affect the sensitivity of the detector. Note that it is not required that bins E and F are classified as motion, even though they likely are, motion can be detected on the basis of bins D and G; at least assuming the other requirement of motion is met, e.g., a sufficient energy in these bins.

In an embodiment, a 5.8 Ghz sensor, is combined with 24 time-samples per slice, 2 adjacent bins on each side, followed by 3 near bins on each side.

Figure 3D:
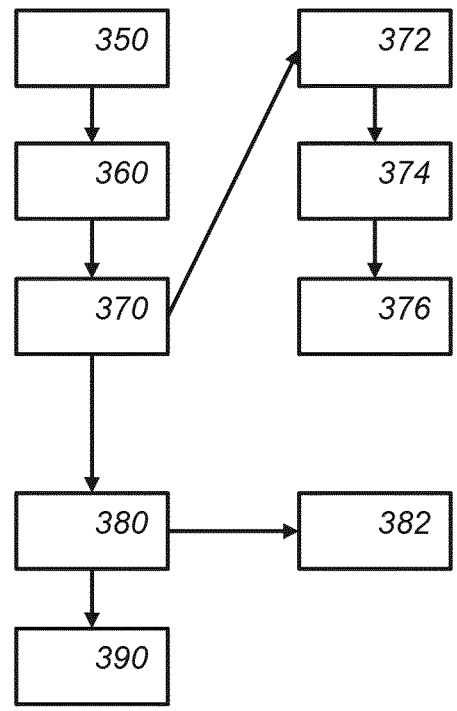

FIG. 3d schematically shows an example of an embodiment of a motion detection method. Shown in FIG. 3d is:

Receiving 350 a signal and performing frequency domain conversion

Identifying 360 the active bins, that is all bins with increased magnitude compared to a baseline for that bin, Estimating 370 active bins as noise caused bins. For example, this may comprise finding 372 the active bins that have no near active bin. Note that adjacent does not count. Such bins are estimated as caused by noise. Estimating 374 an active bin that is adjacent to a noise-estimated bin also as caused by noise. Estimating 376 a bin as a noise-caused bin based on a history for that bin, see further below.

Estimating 380 active bins as motion caused bins. For example, this may comprise finding 382 the active bins that have a near active bin that is not estimated as noise-caused.

Estimating motion 390 from the bins estimated as motion-caused. For example, by computing the energy in the motion-caused bin. This may be a weighted average, e.g., to emphasize certain velocities, e.g., walking velocity. Parts of the method shown in FIG. 3d are optional or may be varied. For example, elements 374 and/or 376 may be omitted, etc.

The noise filter can keep track of historical vibrations, e.g., over multiple days. Bins that often suffer from vibrations can be removed from the motion detection analysis completely. Thus, two different types of using history are identified. Short term history can be used, e.g., by requiring near continuous hum to classify as a persistent noise source. Long term history may be used, but this may use a longer time frame, say a day, but need less persistent hum, say 80%, more than 50%, etc.

Motion detector 100, e.g., noise detector 140 may store a history of the estimated classification for the frequency bins. If a bin has been classified consistently as noise-caused for some time, e.g., for at least 95% of the past 1 seconds, then the bin may be marked as noise-caused. The thresholds 95% and 1 seconds may be varied. A bin marked as noise-caused may be treated as noise estimated. For example, increased magnitude in such a bin may not help to classify another bin as motion-caused. Once a bin is marked as noise-caused it can be unmarked. For example, if the marked bin is consistently not-classified as noise, but, e.g., as motion or as unknown, the marked bin may be unmarked. For example, a marked bin that is not estimated as noise caused for, e.g., for at least 95% of the past 1 seconds, then the bin may be unmarked. A bin may also be unmarked for other causes, e.g., a reset of the system or the like.

Consistent classification turns out to work well on short time intervals. For this reason, this rule is termed short-term memory. For example, motion detector 100 in FIG. 1a may comprise a history unit 160 comprising a short term memory 162 and a long term memory 164. For example, the short-term memory may store the classification for a short past period, e.g., a past second, or past 5 seconds, or more, etc. The long-term memory may store classification of a longer past period, e.g., over hours, a day, etc. For example, a frequency bin may be marked as a noise-caused bin if that bin is classified as noise-caused for a percentage of the time over a further time period, e.g., at least 80% of the time over at least a day. Short-term memory and long-term memory may be combined. Storage 160 may be implemented as an electronic memory, say a flash memory, a volatile memory, or magnetic memory, say hard disk or the like.

Instead of storing long term history, the sensor may also keep a sum that indicates how often a bin was classified as noise-caused. In this way, the average portion of the time that a bin was classified as noise-caused can be computed over the lifetime of the sensor, or over the lifetime since the sensor was reset, etc. If the average is high enough, e.g., over 85%, over 50% etc., then the bin may be marked as noise-caused. In this way, no long-term history needs to be stored at the device.

At the edges of the frequency bin, e.g., at the higher and lower bins some special considerations may be needed. For example, the near or adjacent bins to which the rules refer may not exist. In these cases, the bins or the referred to bins may be ignored. The inventors also found that at the lower end of frequencies the sensors where often unreliable. In an embodiment, frequency bins below a frequency floor (i.e. an upper frequency value below of which a frequency bin is always estimated as caused by noise) are estimated as caused by noise. For example, the noise frequency floor may be less than 9.3 Hz for a 5.8 Ghz sensor. These low frequencies are found to have more spurious signals and are therefore not reliable and consistent. For other sensor modalities this value will change proportionally. For example, this cut-off frequency increases with the frequency of the sensor for a Doppler sensor. Accordingly, a nearby increased bin is the not classified as motion based on the increased magnitude in these very low frequencies.

A motion detector with noise filtering such as motion detector 100 runs a risk of ignoring a motion signal, e.g., mistaking a true motion as noise-caused. As pointed out herein various parameters discussed can be tuned to increase or decrease the likelihood of this happening. The inventors found that mistaking true-motion for noise in a lighting, such as luminaire 170 or lighting system 171 will have more severe effects if people are actually present. In an embodiment, this can be avoided by suppressing noise reduction if people are present, for example if the light emitting element is turned on. Noise reduction can be turned off all together or a different trade off can be configured by changing its parameters, e.g., increasing the number of near bins, and/or decreasing the number of adjacent bins.

If the lights are ON, this implies presence of persons in the detection area. If a noise filter detects a motion signal as noise, and eliminates it, this may not immediately result in severe effect since the lights may not switch off immediately; they may be configured to stay ON for some time after detecting motion. The system keeps looking for a motion and if it sees at least one motion within the configured time interval before it switches OFF, the previous mistake of a false negative is not observed at the system level since the effect is not visible. However, if within the said configured interval no other motion was seen then the lights would eventually switch OFF, resulting in unpleasant behavior.

Typically, the motion detector 100, luminaires 170, 171, lighting controller 175 each comprise a microprocessor which executes appropriate software stored at these devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

In an embodiment, the motion detector comprises one or more electronic circuits. The circuits implement the corresponding units described herein. The circuits may be a processor circuit and storage circuit, the processor circuit executing instructions represented electronically in the storage circuits. A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

A challenge for motion sensors is to not have false positives, i.e. to not have false triggers in case of a non-motion signals such as hum/vibrations, which are quite common. The inventors observed that sometimes during the running of a motion sensor for motion detection, a sudden vibration is seen in the frequency domain which tends to be more localized to one or two adjacent frequency bins, e.g., having a bandwidth of around few Hertz. Such vibrations are generally consistently present for at least few seconds to even sometimes minutes or hours. These vibrations are referred to as hum since they are more localized. In contrast, a motion signal is much broader in the frequency spectrum and therefore, this property can be used to isolate a sudden starting of hum signal versus a motion signal.

As described above, noise sources can cause intermittent elevated signals in a certain frequency bin. The intermittent nature of the signal can cause false positive motion calls. This problem may be addressed with noise detect unit 140, which identifies frequency bins that are likely affected by noise, in particular hum-type noise. Removing such bins from considerations for motion detection works as a noise filter. A hum detector may be implemented as a filtering enhancement for the motion algorithm that identifies frequency bins experiencing a hum condition and eliminates their contribution to calling motion. The additional signal processing was found to detect and account for the majority of the hum or vibrations, so that they are not classified as motions.

In an embodiment, each target bin is checked for hum, e.g., by determining that the near bins, but not immediate adjacent ones, show any motion signals or not. If a signal is seen, then it is more likely that this target bin is not a hum, and therefore it will be correctly classified as motion. And if there is no signal seen in these adjacent bins, then this target bin may be classified as hum.

Although, this algorithm is able to detect many hum signals, it may fail to detect hum, when two or more hums are observed in nearby frequency bins. FIG. 4 shows an example of an embodiment of a frequency versus time diagram. FIG. 4 shows multiple hums starting after some time, within the range 20-40 Hz. Two hum-type noise signals are hums 410 and 411. Multiple hums do not necessarily start at the same instant of time. Note that hum 411 leaks into two frequency bins, but they remain close enough (adjacent bins) to not cancel each other out. However, two nearby hums can cancel each other out if they are not adjacent and also not beyond the near frequency bins threshold; for example, when considering frequency bin 410, the hum at 411 may be mistakenly taken as evidence that hum 410 corresponds to motion. However, in FIG. 4, it is not the case, since 410 is far apart from 411 and is not in the near bin region of the 411 (given the bin resolution) and hence is treated separately, and does not cancel 411 out or vice versa. Since the bin resolution is small, there are several bins between 410 and 411.

The problem of multiple hums may be address by tuning the number of bins taken into account for verifying the presence of motion. For example, it was found advantageous not to check for motion signals too far away from the target bin that is currently being checked for hum, since other hum(s) nearby may cause the target bin to be classified as motion. For example, in an embodiment, check for the motion signals is done in the 5 bins above the target bin, and the 5 bins below, excluding the adjacent ±2 bins. In a 5.8 Ghz sensor, using 2 Hz bins, these parameters were found to perform better than using 6 bins instead of 5.

In general, for a sensor with frequency $f_0$, one may configure the device to ignore excited frequency domain amplitudes that correspond with a spread in $\Delta v$ of less than 0.25 m/s. One may use the relationship:

$$\Delta v = \frac{c}{2f_0} \Delta f,$$

wherein c is the speed of light, $f_0$ is the frequency of the sensor, $\Delta f$ describes the upper limit of excited amplitudes that will be ignored. For example, for a 5.8 GHz sensor one could take Δf to be around 9.7 Hz. If the time domain signal would be sampled at 240 Hz which consequently would be analyzed using a 128-point FFT, one would find that 9.7 Hz approximately corresponds with 5 frequency bins. Excited amplitudes which cover 5 bins or less can be attributed to noise and consequently be ignored in the computation for motion.

Once a bin has been identified as noise, the adjacent bins may be removed from consideration as motion, or even marked as noise themselves. For example, this may be done for the adjacent ±2 bins.

There remains a risk that two hums very close to each other may recognize each other as motion signals. This is addressed using hum-history. If there was a hum identified earlier, and a new hum starts in its vicinity, the check for motion signals will ignore the previous hum signals, by looking at its history information. For example, the hum-history estimation may be made by checking for a continuous change in hum-bin state, e.g., a continuous change to as noise-caused. For example, a continuous classification as noise for the last 1 second. If such a change is determined, a hum-history flag may be set for that bin. Once the history-flag is set, it is ignored for classifying a bin as motion. The period of 1 second may be configurable. The hum-history flag may be changed, e.g., either towards a positive or negative hum history flag decision after the configurable time period. In an embodiment, the period is taken as 400 ms.

History can also be used over longer time periods, e.g., period of an hour or more, or a day or more, etc. For example, the noise detect unit may be configured to store historical noise classifications. Bins that often suffer from vibrations can be removed from the motion detection analysis completely.

Very low bins, e.g., less than 9.3 Hz for a 5.8 Ghz sensor, may be ignored, e.g., for motion classification and/or for motion detection, since they have more spurious signals and are therefore not reliable and consistent towards hum detection.

In an embodiment, hum checking is started for each frequency bin above 9.3 Hz, in case of 5.8 Ghz sensor; this may be approximated, e.g., by starting hum checking at 10 Hz. A target bin is checked for any signals in the near bins spanning a number of bins, e.g., ±5 bins, around the target bin being checked for hum, excluding adjacent bin, e.g., the adjacent ±2 bins. In an embodiment, if an increased magnitude is seen in a near bin, it is verified that this bin did not have its hum history flag set, e.g., it was not recognized historically as a hum bin. If it was a hum bin, ignore this motion indicator as hum, and check for other bins around the target bin.

If no increased magnitudes are determined in any of the remaining near bins, the target bin is determined to be a hum signal, and hum history information may be added. Although, for this execution cycle of the algorithm the target bin was considered as a hum signal and its output was ignored, however for the next execution cycle of the algorithm and for some other target bin, this bin may be a near bin, and will not have a hum history flag set. At some point though, the hum history flag may be set if the bin satisfies the requirements, e.g., a sufficient persistent hum for a sufficient long time. For example, in an embodiment the hum history flag may be set if there is a continuous, e.g., at least 0.2, at least 0.4, at least 1 second of hum detection for the target bin. For a hum history flag to be unset there may be similar period of similar persistent classification as non-noise.

Additionally, if a target bin is recognized as hum based on the above defined mechanism, the algorithm may check for an increased magnitude in adjacent bins, e.g., ±2 bins. If there are such signals, they are ignored as hum-tail from the decision making process of motion detection.

Although the hum detector parameters can be carefully tuned, there is always the risk that the hum filter identifies motion events as a vibration. This could be of particular importance for small motions such as motions that humans make behind a desk in the office. In order to circumvent this problem, the hum filter can be switched off in case people are present. One method for incorporating this aspect is to have the hum filter active in case the light is off and the hum filter switched off if the light is on.

Vibrations are often due to mechanical structures in the environment such as a lamella optic present in T-LED fixtures. These vibrations often have the same signature. For this reason, the hum detector often has to deal with vibrations that are very similar. Instead of relying on the hum detector's instantaneous ability to filter these out, the hum detector may also at some point, e.g., if the vibrations have appeared sufficiently often, completely ignore those frequency bins that have experienced problems with vibrations.

The hum history can be used to identify hums with a higher accuracy. The motion detection algorithm runs at a certain rate, e.g., iteratively, e.g., every 100 ms, the motion detector may report motion/no motion. If a motion signal is observed, it is often not required to report this immediately. In an embodiment, multiple iterations, e.g., 4 iterations which may be 400 ms, before reporting the observed signal. This reduces the chance of false positive motion signals. Although hums start nearly instantaneously, they hardly change after they have started. This means that the hum history also hardly changes. As one has a few frames of time, one can use this time for monitoring changes in the hum history. If these changes fall below a threshold, then one can more confidently indeed identify the signal as vibration and report no-motion. If the history does have changes above a certain threshold, then one can report motion.

The noise detection can be used for any products utilizing a time-varying sensor signal. For example, the noise detection was found effective for a Doppler motion sensor. The noise detection could be used for different types of sensors too. For example, an ambient light sensor suffers from similar noise sources, e.g., vibrational noise, electrical noise, etc.

Figure 6:
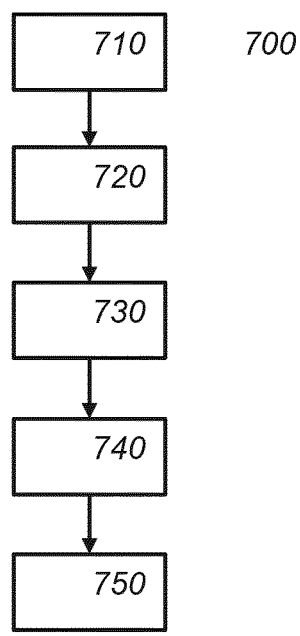

FIG. 6 schematically shows an example of an embodiment of a motion detect method 700. The motion detector method 700 comprises:

receiving (710) a sensor signal of a motion sensor, converting (720) the sensor signal to a frequency domain, obtaining a plurality of frequency bins, identifying (730) frequency bins having an increased magnitude, estimating (740) if the identified frequency bins correspond to a motion source in the environment or to a noise source in the environment, determining (750) from the identified frequency bins estimated as corresponding to a motion source if the environment is classified as quiet or motion.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, steps 730, 740 may be executed, at least partially, in parallel. Moreover, a given step may not have finished completely before a next step is started.

Embodiments of the method may be executed using software, which comprises instructions for causing a processor system to perform method 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
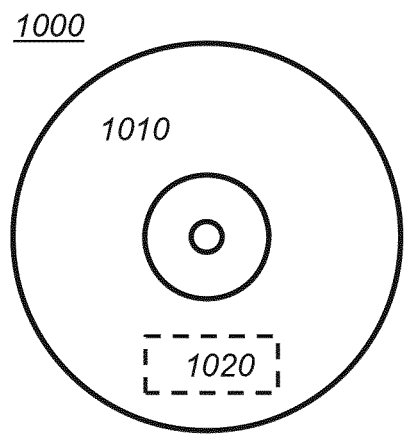

FIG. 7a shows a computer readable medium 1000 having a writable part 1010 comprising a computer program 1020, the computer program 1020 comprising instructions for causing a processor system to perform a motion detection method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said motion detection method.

Figure 7B:
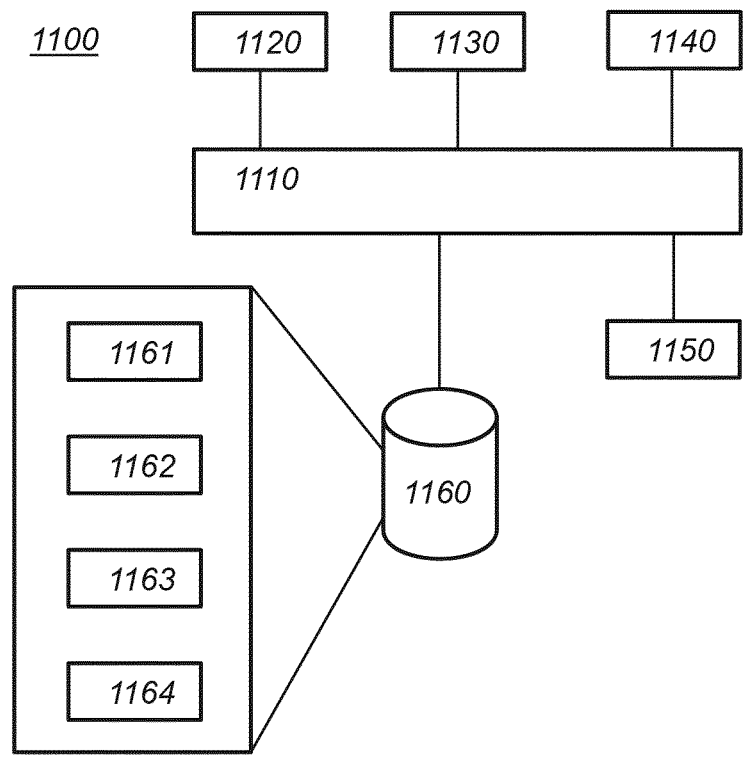

FIG. 7b illustrates an exemplary hardware diagram 1100 for implementing a device according to an embodiment. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for converting the sensor signal to a frequency domain, obtaining a plurality of frequency bins, instructions 1163 for identifying frequency bins having an increased magnitude, and estimating if the identified frequency bins correspond to a motion source in the environment or to a noise source in the environment, and instructions 1164 for determining from the identified frequency bins estimated as corresponding to a motion source if the environment is classified as quiet or motion.

It will be apparent that various information described as stored in the storage 1160 may be additionally or alternatively stored in the memory 1130. In this respect, the memory 1130 may also be considered to constitute a "storage device" and the storage 1160 may be considered a "memory.". Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein.

Further, where the device 1100 is implemented in a cloud computing system, the various hardware components may belong to separate physical systems. For example, the processor 1120 may include a first processor in a first server and a second processor in a second server.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware.

In the claims references in parentheses refer to reference signs in drawings of exemplifying embodiments or to formulas of embodiments, thus increasing the intelligibility of the claim. These references shall not be construed as limiting the claim.

The invention claimed is:

1. A motion detector configured to classify an environment as quiet or motion, the motion detector comprising:
   a signal input for receiving a sensor signal of a motion sensor,
   a processor configured to:
      convert the sensor signal to a frequency domain, obtaining a plurality of frequency bins,
      identifying frequency bins having an increased magnitude,
      estimating whether the identified frequency bins correspond to a motion source in the environment or to a noise source in the environment, by estimating an identified frequency bin with increased magnitude as caused by noise by determining that near frequency bins have no increased magnitude, wherein a frequency bin is near if a frequency difference between the near frequency bin and the identified frequency bin is below an upper frequency threshold and above a lower frequency threshold,
      determining from the identified frequency bins estimated as corresponding to a motion source whether the environment is classified as quiet or motion, by estimating an identified frequency bin with increased magnitude as corresponding to a motion source by determining that near frequency bins have increased magnitude and are not estimated as caused by noise and by determining that said identified frequency bin has a magnitude that exceeds a threshold value.

2. The motion detector as in claim 1, wherein the determining whether the environment is classified as quiet or motion comprises determining an energy in the frequency bins estimated as corresponding to a motion source, the environment being classified as motion if the determined energy exceeds a threshold.

3. The motion detector as in claim 1, wherein the estimating further comprises estimating an identified frequency bin as caused by noise if the frequency bin is adjacent a frequency bin estimated as caused by noise, wherein a frequency bin is adjacent if a frequency difference between the adjacent frequency bin and the identified frequency bin is below the lower frequency threshold.

4. The motion detector as in claim 1, wherein the processor is configured to mark a frequency bin as a noise-caused bin if said frequency bin is consistently estimated as caused by noise over a period of time.

5. The motion detector as in claim 4, wherein the processor is configured to unmark a frequency bin as a noise-caused bin if said frequency bin is estimated as not caused by noise over a period of time.

6. The motion detector as in claim 1, wherein estimating the identified frequency bin as caused by motion further comprises determining that a near frequency bin has increased magnitude and is not estimated as caused by noise and not marked as a noise-caused bin.

7. The motion detector as in claim 1, wherein a frequency bin below a frequency floor is estimated as caused by noise.

8. The motion detector as in claim 4, wherein the processor is configured to mark a frequency bin as a noise-caused bin if said frequency bin is estimated as caused by noise over at least a part of a further period of time.

9. The motion detector as claim 1, wherein the motion sensor is a Doppler motion sensor, micro-wave sensor, or ambient light sensor.

10. The luminaire comprising a motion detector as in claim 1, the luminaire being connectable to a light-emitting element and being configured to control the light-emitting element at least in dependency upon whether the environment is classified as quiet or motion by the motion detector.

11. The luminaire as in claim 10, wherein the processor is further configured to turn-off estimating whether the identified frequency bins correspond to a motion source in the environment or to a noise source in the environment if the light emitting element is turned on.

12. A motion detection method configured to classify an environment as quiet or motion, the motion detector method comprising:
   receiving a sensor signal of a motion sensor,
   converting the sensor signal to a frequency domain, obtaining a plurality of frequency bins,
   identifying frequency bins having an increased magnitude,
   estimating if the identified frequency bins correspond to a motion source in the environment or to a noise source in the environment, by estimating an identified frequency bin with increased magnitude as caused by noise, by determining that near frequency bins have no increased magnitude, wherein a frequency bin is near if a frequency difference between the near frequency bin and the identified frequency bin is below an upper frequency threshold and above a lower frequency threshold,
   determining from the identified frequency bins estimated as corresponding to a motion source if the environment is classified as quiet or motion, by estimating an identified frequency bin with increased magnitude as corresponding to a motion source, by determining that a near frequency bin has increased magnitude and is not estimated as caused by noise and by determining that said identified frequency bin has a magnitude that exceeds a threshold value.

13. A non-transitory computer readable medium comprising data representing instructions which, when executed by a processor system, cause the processor system to perform steps of the method according to claim 12.

* * * * *